US007599725B2

(12) United States Patent
Park et al.

(10) Patent No.: US 7,599,725 B2
(45) Date of Patent: Oct. 6, 2009

(54) MOBILE COMMUNICATION TERMINAL HAVING DUAL INTENNA

(75) Inventors: Young-Bong Park, Seoul (KR); Sang-Won Moon, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 586 days.

(21) Appl. No.: 11/172,268

(22) Filed: Jun. 29, 2005

(65) Prior Publication Data

US 2005/0287959 A1 Dec. 29, 2005

(30) Foreign Application Priority Data

Jun. 29, 2004 (KR) ...................... 10-2004-0049397

(51) Int. Cl.
*H04M 1/00* (2006.01)

(52) U.S. Cl. .............. 455/575.7; 455/575.5; 455/575.3; 343/720; 343/872

(58) Field of Classification Search .............. 455/575.5, 455/575.8, 575.1, 575.3; 343/720, 872, 873
See application file for complete search history.

(56) References Cited

U.S. PATENT DOCUMENTS

| | | | | |
|---|---|---|---|---|
| 5,608,413 | A * | 3/1997 | Macdonald | 343/700 MS |
| 6,456,249 | B1 * | 9/2002 | Johnson et al. | 343/702 |
| 2005/0243000 | A1 * | 11/2005 | Hwang et al. | 343/702 |
| 2005/0259011 | A1 * | 11/2005 | Vance | 343/702 |
| 2006/0142072 | A1 * | 6/2006 | Krenz et al. | 455/575.3 |
| 2006/0145931 | A1 * | 7/2006 | Ranta | 343/702 |
| 2006/0258414 | A1 * | 11/2006 | Vance et al. | 455/575.7 |

FOREIGN PATENT DOCUMENTS

KR 2002-0030990 4/2002

* cited by examiner

*Primary Examiner*—Edward Urban
*Assistant Examiner*—Christian A Hannon
(74) *Attorney, Agent, or Firm*—H.C. Park & Associates, PLC

(57) ABSTRACT

A mobile communication terminal having two distinct intennas for selectively using the two distinct intennas according to a state of a folder is disclosed. The mobile communication terminal includes: a radio frequency (RF) switching unit for determining whether a folder of the mobile communication terminal is opened or closed; a first intenna used when the RF switching unit determines that the folder is closed; and a second intenna used when the RF switching unit determines that the folder is opened.

11 Claims, 11 Drawing Sheets

MOBILE COMMUNICATION TERMINAL HAVING DUAL INTENNA

FIELD OF THE INVENTION

The present invention relates to a mobile communication terminal having a dual intenna; and, more particularly, to a mobile communication terminal having a dual intenna including a built-in antenna for a low-power mobile communication terminal.

DESCRIPTION OF RELATED ARTS

FIG. 1 is a block diagram illustrating a mobile communication terminal having an intenna in accordance with a prior art.

As shown in FIG. 1, the mobile communication terminal includes an intenna 110, a power feeder 120, an impedance matching unit 130, a radio frequency (RF) transmitting/receiving unit 140, a main processing unit 150 and a magnetic sensor 160.

The intenna 110 is mounted inside a housing of the mobile communication terminal for transmitting/receiving a radio frequency (RF) signal between the mobile communication terminal and a base station. The power feeder 120 transfers a RF signal received through the intenna 110 to the impedance matching unit 130 and transfers a RF signal inputted from the impedance matching unit 130 to the intenna 110. The impedance matching unit 130 performs an intenna matching operation by controlling impedance. The RF transmitting/receiving unit 140 generates receiving data by processing a RF signal inputted through the impedance matching unit 130. The RF transmitting/receiving unit 140 also generates a transmitting RF signal by processing transmitting data and transmits the generated transmitting RF signal through the impedance matching unit 130. The main processing unit 150 processes the receiving data inputted from the RF transmitting/receiving unit 140, generates the transmitting data and outputs the generated transmitting data to the RF transmitting/receiving unit 140. The main processing unit 150 also controls the mobile communication terminal to be activated or inactivated according to a level of an open/close sensing signal. The magnetic sensor 160 senses whether a folder of the mobile communication terminal is opened or closed based on changes of a magnetic field and the magnetic sensor 160 generates an open/close sensing signal having distinct levels according to the result of sensing. The generated open/close sensing signal is transferred to the main processing unit 150.

FIG. 2 is an exploded perspective view of a mobile communication terminal having an intenna in accordance with a prior art. As shown in FIG. 2, a chip type intenna 110 is mounted inside housings 100 and 101.

Recently, mobile communication terminals with an intenna have been released onto the market. The intenna is a built-antenna mounted in a mobile communication terminal and a global system for mobile communication (GSM) terminal is firstly introduced to the public as a terminal having an intenna. Since the GSM terminal adapts a time division multiple access (TDMA) and has a comparative high-power, a field environment of the intenna is not much effected although the intenna is mounted inside a housing of the GSM terminal.

Meanwhile, a code division multiple access (CDMA) terminal has comparative low power and generally includes a chip type intenna. A receiving sensibility of the CDMA terminal is degraded by a hand effect. The hand effect is an effect degrading a receiving sensibility by a user's hand. If the power of the CDMA terminal increases to avoid the hand effect, a specific absorption rate (SAR) of an electromagnetic wave increases too.

In order to overcome the described problems, a planar inverted F antenna (PIFA) may be used as an intenna. However, the PIFA antenna occupies comparative large area of a terminal although the PIFA increases the receiving sensibility.

SUMMARY OF THE INVENTION

It is, therefore, an object of the present invention to provide a mobile communication terminal having a dual intenna for improving a receiving sensibility by selectively using distinct intenna modules according to a call mode or a call-waiting mode of the mobile communication terminal in order to overcome problems of a hand effect and a specific absorption rate (SAR) of an electromagnetic wave.

In accordance with an aspect of the present invention, there is provided a mobile communication terminal having a dual intenna, including: a radio frequency (RF) switching unit for determining whether a folder of the mobile communication terminal is opened or closed; a first intenna used when the RF switching unit determines that the folder is closed; and a second intenna used when the RF switching unit determines that the folder is opened.

The RF switching unit may connect a main processing unit of a main printed circuit board of the mobile communication terminal to the first intenna when the folder is closed, and may connect the main processing unit to the second intenna when the folder is opened.

The RF switching unit may include: a RF switch having a plural of ports including a first intenna connection port connected to the first intenna, a second intenna connection port connected to the second intenna, a main processing unit connection port connected to the main processing unit of the main printed circuit board, and an intenna selection control port connecting the first intenna connection port and the main processing unit connection port, or connecting the second intenna connection port and the main processing unit connection port according to a provided electric signal; a power feeder connected to the main processing unit connection port of the RF switch for transferring a RF signal inputted through the first intenna and the second intenna to an impedance matching unit and transfers a RF signal inputted from the impedance matching unit to the first intenna and the second intenna; a RF switch controller for supplying an electric signal connecting the main processing unit connection port and the first intenna connection port to the intenna selection control port of the RF switch when the folder is closed, and supplying another electric signal connecting the main processing unit connection port and the second intenna connection port to the intenna selection control port of the RF switch when the folder is opened; and a power supplier for supplying an electric power to the RF switch to drive.

The RF switch controller may includes: a voltage supplier connected to the intenna selection control port of the RF switch for supplying an electric signal to the intenna selection control port; a transistor having one end connected to the voltage supplier and the intenna selection control port in a parallel by being branched to the voltage supplier and the voltage supplier and another end connected to a ground; and an open/close state sensor for transmitting a low electric signal or a high electric signal to the transistor according to when the folder is opened or when the folder is closed in order to turn on or off the transistor. The open/close state sensor may be configured with magnetic sensors mounted at both side of a housing of the mobile communication terminal.

The open/close state sensor may transmit a low electric signal to the transistor when the folder is closed and may transmit a high electric signal to the transistor when the folder is opened; the transistor may be turned off by receiving the low electric signal from the open/close state sensor and may be turned on by receiving the high electric signal from the open/close state sensor; and the RF switch may connect the main processing unit connection port and the first intenna connection port if a signal supplied to the intenna selection control port is a high and may connect the main processing unit connection port and the second intenna connection port if a signal supplied to the intenna selection control port is a low.

Accordingly, when the folder of the mobile communication terminal is closed, the first intenna may be used by operations that the open/close state sensor transmits the low electric signal to the transistor to turn off the transistor, a high electric signal supplied from the voltage supplier is supplied to the intenna selection control port without modifying by turning off the transistor, and the main processing unit connection port and the first intenna connection port are connected by the high electric signal; and when the folder is opened, the second intenna may be used by operations that the open/close sensor transmits a high electric signal to the transistor for turning on the transistor, the turned-on transistor discharges an electric signal supplied from the voltage supplier to a ground, a low electric signal is supplied to the intenna selection control port by discharging, and the main processing unit connection port and the second intenna connection port are connected by the low electric signal.

The first intenna, which is a finger pattern intenna, may include: a horizontal radiator made of a flat plane radiating material and arranged in parallel to a longitudinal direction of the mobile communication terminal for forming a horizontal electric field; a vertical radiator formed orthogonal to the horizontal radiator for forming a vertical electric field; and a connector made of a radiating material for connecting the vertical radiator and the horizontal radiator.

The first intenna may further include: a second vertical radiator arranged at the vertical radiator in a parallel within a predetermined space; and a protrusion formed inside of a housing of the mobile communication terminal where the vertical radiators are mounted for firmly fixing the first intenna to the housing.

The first intenna may be connected to a main printed circuit board through an antenna holder.

The first intenna may further include an antenna holder connection port formed to be extended orthogonally to the vertical radiators from a central part of the connector and to be bended to the antenna holder, the antenna holder and the first intenna may be connected and a bended portion of the connecting terminal may maintain the connection to the antenna holder by an elastic force.

The antenna holder may be formed as a circular disc for forming an electric field in a horizontal direction.

The second intenna, which is a flex pattern intenna, may have a curvy shape with rounded corners in order to lengthen a length of the second intenna.

The second intenna may include: a first curved portion formed at a left end of the second intenna by being bended two times as to form the shape of two "∩"s having a comparatively low height; a second curved portion formed to be symmetrical to the first curved portion at a right end of the second intenna with a comparatively low height; a third curved portion formed at a middle of the second intenna between the first curved portion and the second curved portion by being bended three times as to form a shape of three "∪"s having a height higher then the first and the second curved portion; a first connecting portion formed to have a shape of "∩" having a comparatively wider width for connecting the first curved portion and the third curved portion; and a second connecting portion formed to have a shape of "∩" having comparatively wider width for connecting the second curved portion and the third curved portion.

A total length of the first curved portion, the first connecting portion, the third curved portion, the second connecting portion and the second curved portion may be about 39.6 mm; a thickness of a copperplate forming an antenna radiating material may be 1 mm and a width of each curved portion may be about 1 mm; a width of "∩" at a left end of the first curved portion may be about 1.37 mm and a width of "∩" at a right end of the second curved portion may be about 0.97 mm; and a width of the first connecting portion may be about 6.30 mm, a width of the second connecting portion may be about 4 mm and a height of the third curved portion may be about 6.08 mm.

The first intenna may be manufactured with a ground flexible printed circuit board (FPCB) without being separated and the second intenna may be mounted around a hinge of an upper housing, where a display is mounted, of the mobile communication terminal.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, a mobile communication terminal having a dual intenna in accordance with a preferred embodiment of the present invention will be described in more detail with reference to the accompanying drawings.

Figure 1:
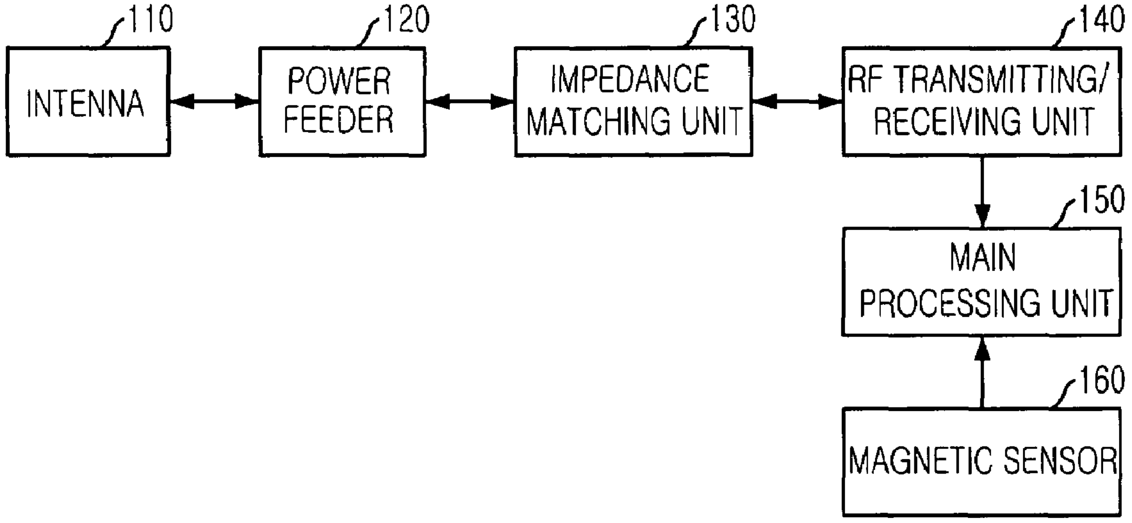
FIG. 1 (PRIOR ART)
FIG. 1 is a block diagram illustrating a mobile communication terminal having an intenna in accordance with a prior art.
Figure 2:
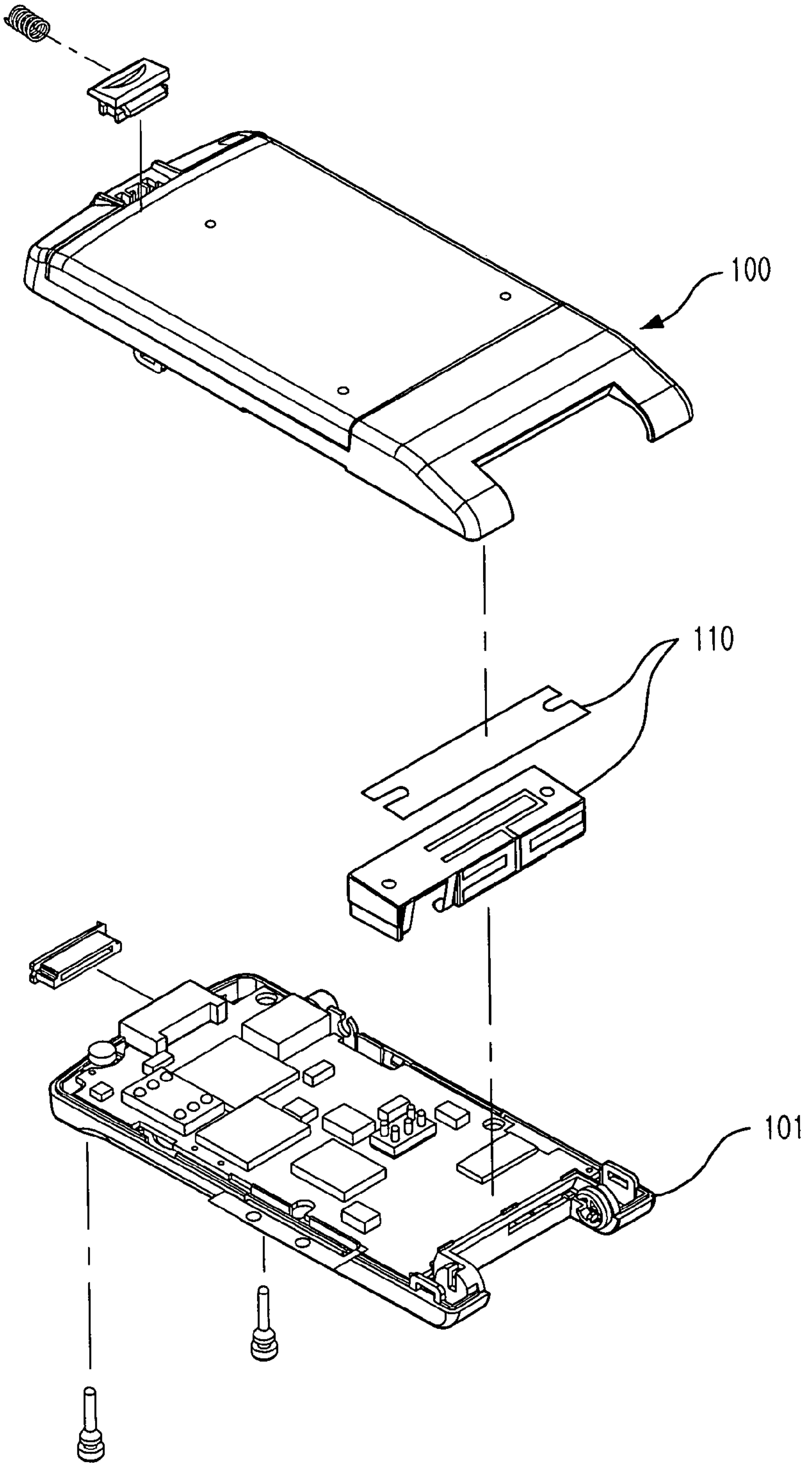
FIG. 2 (PRIOR ART)
FIG. 2 is an exploded perspective view of a mobile communication terminal having an intenna in accordance with a prior art.
Figure 3:
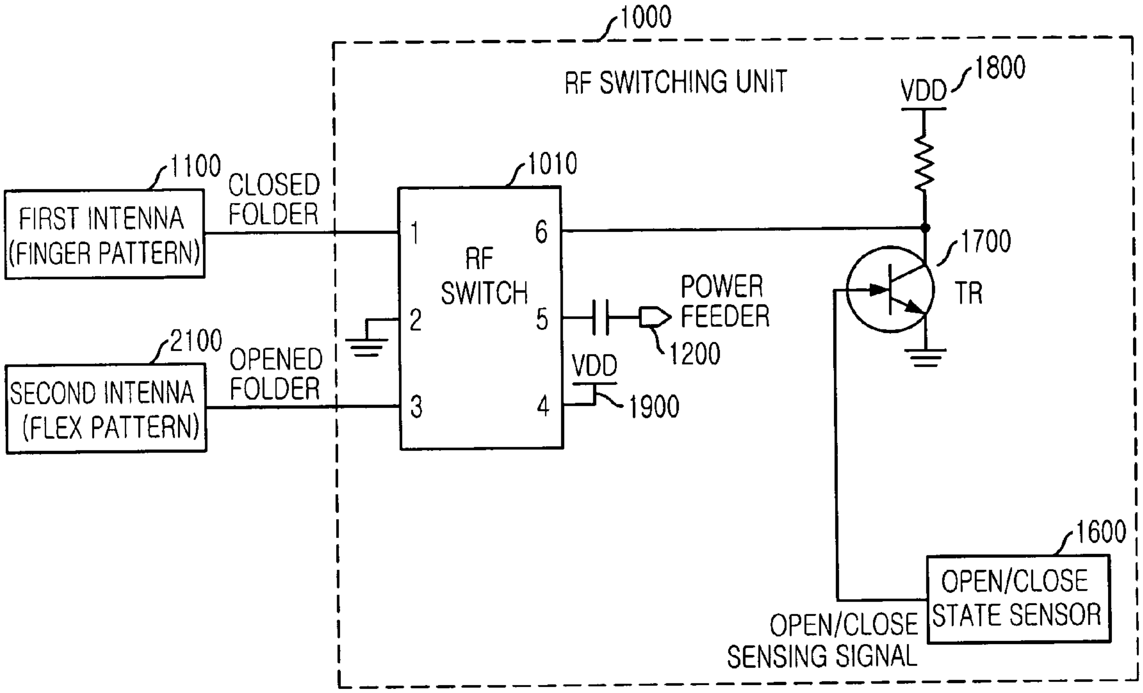
FIG. 3 is a block diagram illustrating a mobile communication terminal having a dual intenna in accordance with a preferred embodiment of the present invention.

FIG. 3 is a block diagram illustrating a mobile communication terminal having a dual intenna in accordance with a preferred embodiment of the present invention.

As shown in FIG. 3, the mobile communication terminal according to the present embodiment includes: a radio frequency (RF) switching unit 1000 for determining a state of a folder unit of the mobile communication terminal as one of a open state and a close state, where the open state represents that the folder unit is opened and the close state represents that the folder unit is closed; a first intenna 1100 used when the RF switching unit 1000 determines the state of the folder unit as the close state; and a second intenna 2100 used when the RF switching unit 1000 determines the state of the folder unit as the open state. That is, the RF switching unit 1000 has a circuit structure switching to connect a main printed circuit board (not shown) of the mobile communication terminal and the first intenna 1100 when the folder unit is closed, and to connect the main printed circuit board and the second intenna 2100 when the folder unit is opened.

In the present embodiment, the RF switching unit 1000 includes a RF switch 1010, a power feeder 1200, a power supply 1900 and a RF switch controlling unit.

The RF switch 1010 includes six ports having a first port 1 connected to the first intenna 1100 as a first intenna connection port, a second port 2 connected to a ground, a third port 3 connected to the second intenna 2100 as a second intenna connection port, a fourth port 4 connected to the power supply 1900, a fifth port 5 connected to the power feeder 1200 and a sixth port 6 connected to the RF switch controlling unit. The sixth port 6 of the RF switch 1010 is an intenna selection control port that connects the first port 1 and the fifth port 5, or connects the second port 2 and the fifth port 5 according to an electric signal provided from the RF switch controlling unit. The fifth port 5 of the RF switch 1010 is a main processing unit connection port.

The power feeder 1200 is connected to the fifth port 5 of the RF switch 1010. The power feeder 1200 transfers a RF signal inputted through one of the intennas 1100 and 2100 to an impedance matching unit (not shown) and transfers a RF signal inputted from the impedance matching unit (not shown) to one of the intennas 1100 and 2100.

The power supply 1900 supplies an electric power to the RF switch 1010 to drive the RF switch 1010.

The RF switch controlling unit supplies an electric signal to the sixth port 6 of the RF switch 1010. That is, the RF switch controlling unit supplies an electric signal to connect the fifth port 5 and the first port 1 when a folder is closed, and supplies another electric signal to connect the fifth port 5 and the second port 2 when the folder is opened. In order to provide the electric signal, the RF switch controlling unit includes: a voltage supplier 1800 connected to the sixth port 6 of the RF switch 1010 for supplying an electric signal to the sixth port 6; a transistor 1700 having one end branching to the voltage supplier 1800 and the sixth port 6 in parallel, and another end connected to a ground; and an open/close state sensor 1600 transmitting a low electric signal or a high electric signal according to the open state or the close state of the folder unit to the transistor 1700 for turning on or off the transistor 1700. The open/close state sensor 1600 is configured with magnetic sensors equipped in both sides of a folder unit of the mobile communication terminal.

The RF switch controlling unit having the above described structure performs operations as follows. When the folder unit is closed, the open/close state sensor 1600 detects magnetic fields of sensors in both sides of the folder unit and transfers a low electric signal to the transistor 1700 for turning off the transistor 1700. When the transistor 1700 is turned off, a high electric signal supplied from the voltage supplier 1800 is supplied to the sixth port 6. If the high electric signal is supplied to the sixth port 6, the fifth port 5 and the first port 1 are connected. As a result, the first intenna 1100 is connected and used to transmit/receive signals.

When the folder unit is opened, the open/close state sensor 1600 does not detect the magnetic field and the transistor 1700 becomes turned on. When the transistor 1700 is turned on, an electric signal of the voltage supplier 1800 is discharged to the ground through the transistor 1700. If the electric signal of the voltage supplier 1800 is discharged, a low electric signal is supplied to the sixth port 6, the fifth port 5 and the third port 3 are connected. As a result, the second intenna 2100 is connected and used to transmit/receive signals.

In the present embodiment, the first intenna 1100 having superior sensibility in the close state and the second intenna 2100 having superior sensibility in the open state are automatically selected and used according to the state of the folder unit. Therefore, a speech quality of the mobile communication terminal is improved.

Figure 4A:
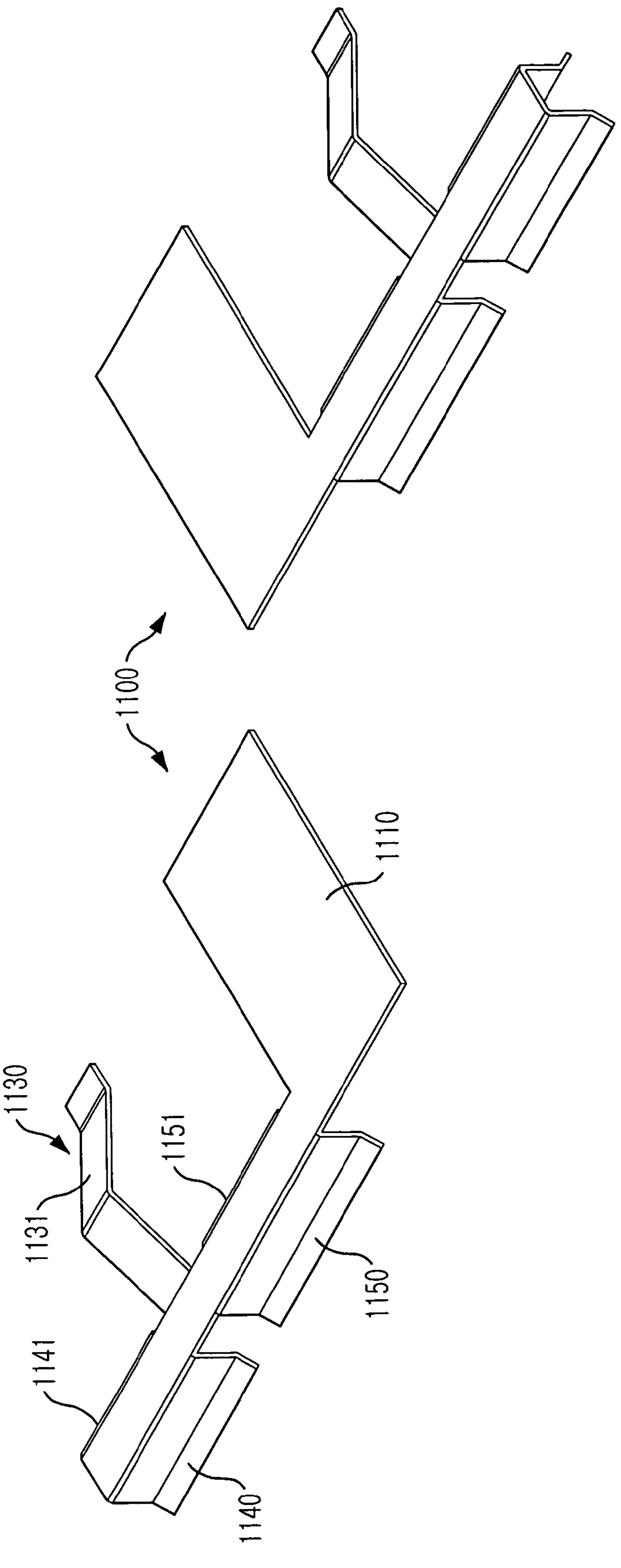
FIG. 4A is a perspective view of a finger pattern intenna of a mobile communication terminal having a dual intenna in accordance with a preferred embodiment of the present invention.
Figure 4B:
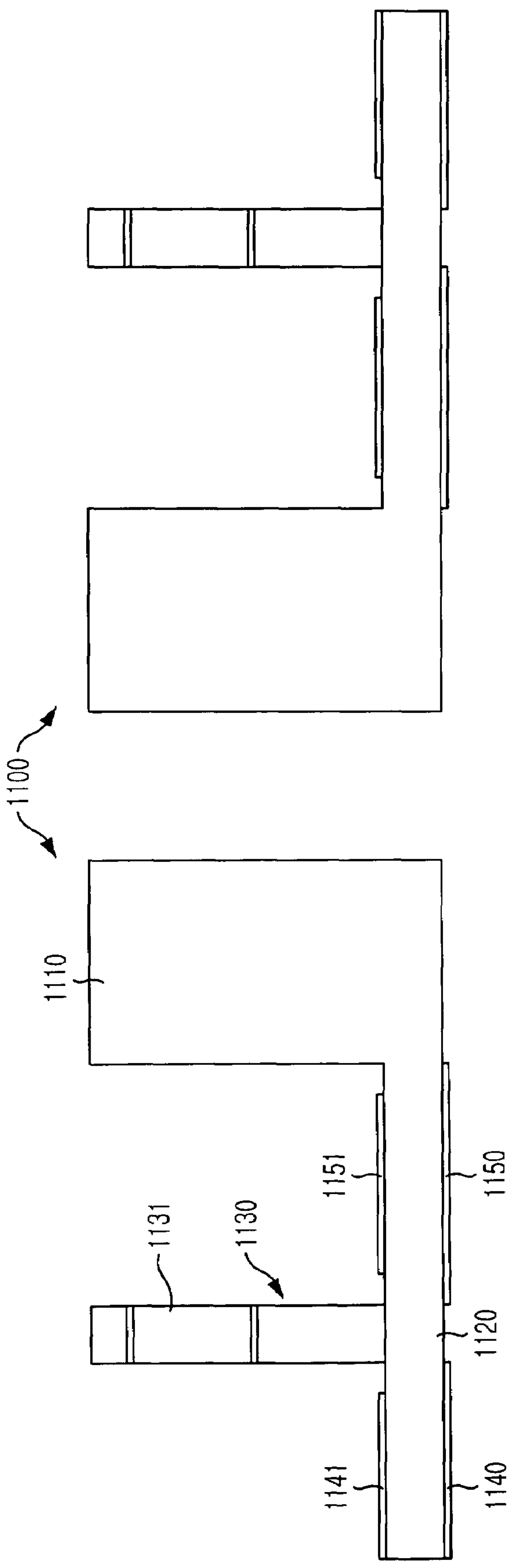
FIG. 4B is a plane view of the finger pattern intenna in FIG. 4A.
Figure 4C:
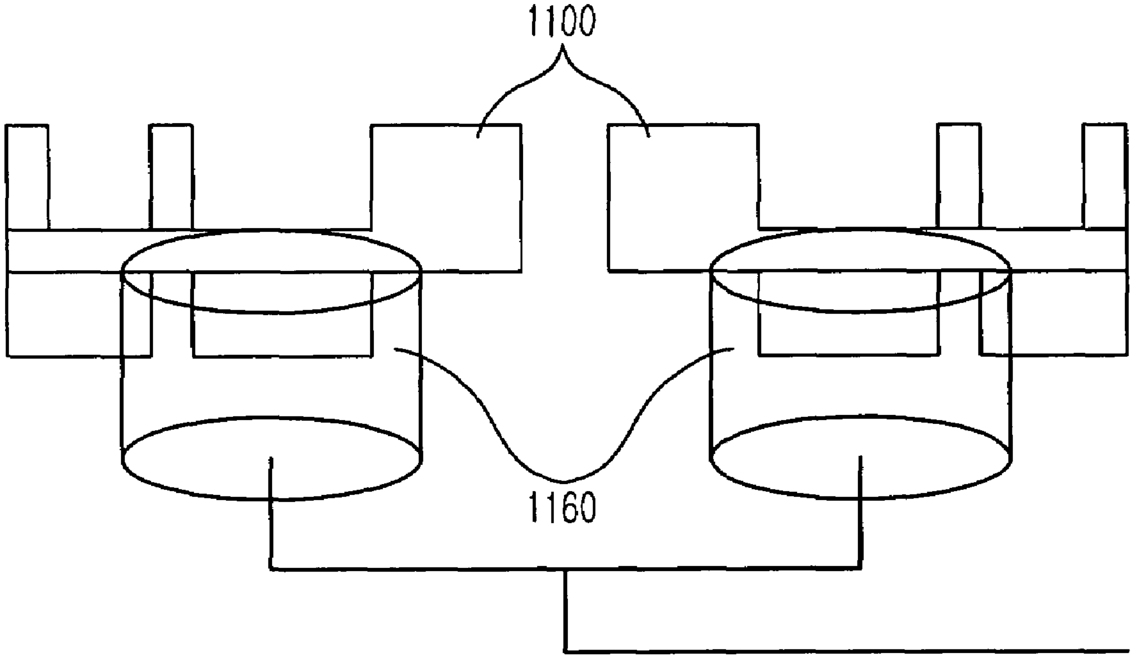
FIG. 4C is a conceptual view of a finger pattern intenna mounted in a folder.

FIG. 4A is a perspective view of a finger pattern intenna which is a first intenna 1100 used in a close state of a folder unit and FIG. 4B is a plan view of FIG. 4A. FIG. 4C is a conceptual view of a finger pattern intenna mounted in a folder unit. Furthermore, FIG. 5A is a plan view illustrating a finger pattern intenna mounted in a main body housing of a mobile communication terminal having a dual intenna and FIG. 5B is a plan view showing a finger pattern intenna of FIG. 5A covered by an antenna holder by putting an antenna holder equipped printed circuit board (PCB) on the intenna pattern.

As shown in FIGS. 4A to 4C, an intenna used in the close state of the mobile communication terminal is called as a finger pattern intenna. The finger pattern intenna is configured with flat plate radiators. The finger pattern intenna includes a horizontal radiator 1110 for forming a horizontal electric field by being arranged in a parallel with a longitudinal direction of the mobile communication terminal; vertical radiators 1140, 1150 for forming a vertical electric field by being formed to be orthogonal to the horizontal radiator 1110; and a connector 1120 made of a radiator material connecting the horizontal radiator and the vertical radiator. Since the finger pattern intenna has a three-dimensional radiating structure configured with the vertical radiators and the horizontal radiator as shown, the finger pattern intenna has better sensibility than a linear type antenna or a flat plane type antenna.

Furthermore, the finger pattern intenna includes second vertical radiators 1141, 1151 separated with a predetermined space from the vertical radiators 1140 and 1150 as shown. Such dual radiating structure may increase a gain. Also, a protrusion is formed inside a housing of the mobile communication terminal to be interposed between the vertical radiators. That is, the protrusion of the housing is interposed between the vertical radiators 1140, 1150 and the second vertical radiators 1141, 1151 when the finger pattern intenna is mounted inside the housing for supporting the finger pattern intenna to be firmly fixed to the housing.

Figure 5A:
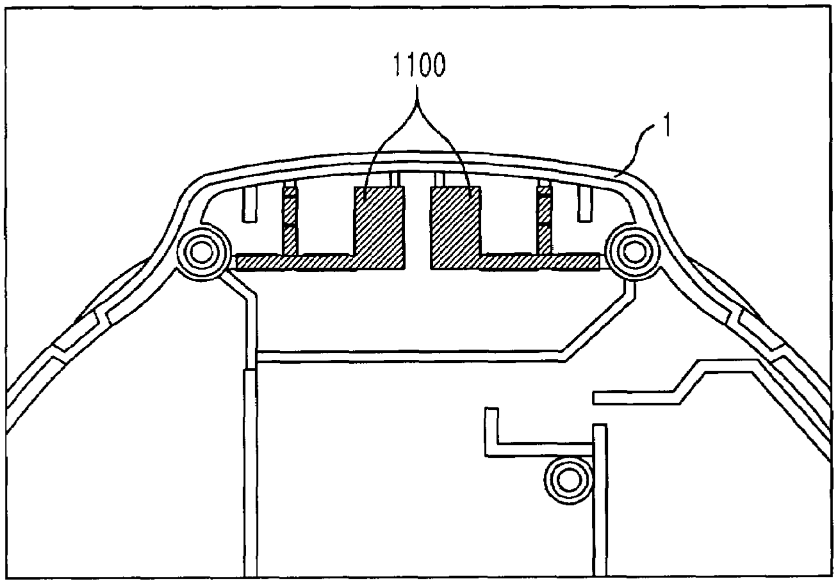
FIG. 5A is a plane view illustrating a finger pattern intenna mounted in a main body housing of a mobile communication terminal having a dual intenna in accordance with a preferred embodiment of the present invention.
Figure 5B:
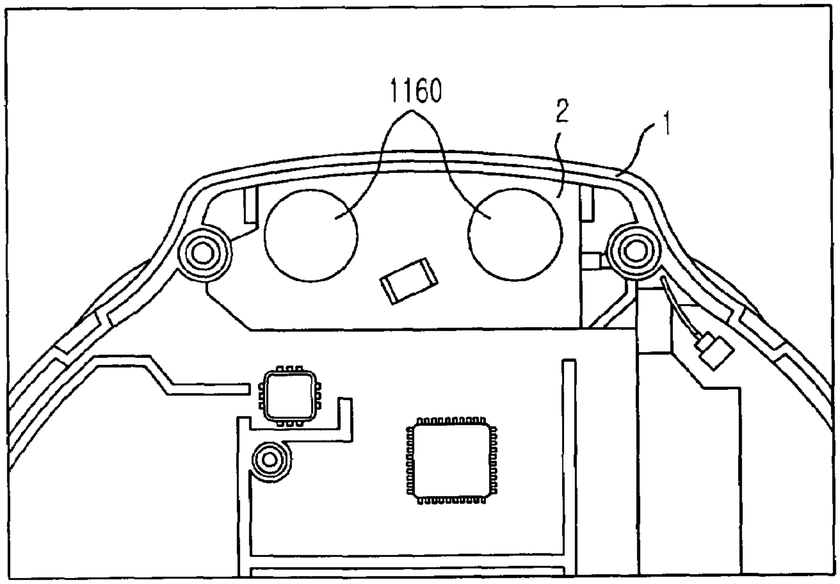
FIG. 5B is a plane view showing a finger pattern intenna in FIG. 5A covered by an antenna holder by putting an antenna holder equipped printed circuit board (PCB) on the finger pattern intenna.

As shown in FIGS. 5A and 5B, the finger pattern intenna 1100 is connected to a main printed circuit board (not shown) through an antenna holder 1160. Such a connection between the finger pattern intenna 1100 and the main printed circuit board is achieved by an antenna holder connection part 1130. The antenna holder connection part 1130 is formed to be extended from a central part of the connector 1120 and orthogonally to the vertical radiators. The antenna holder connection part 1130 includes a bending portion 1131 has an elasticity. Accordingly, the connection between the finger pattern intenna 1100 and the antenna holder is effectively maintained by the elasticity of the bending portion 1131.

Since the antenna holder is formed as a circular disc shape and in a parallel to a longitudinal direction of the mobile communication terminal, the antenna holder forms an electric field in a horizontal direction. Accordingly, the antenna holder additional increases the receiving sensibility. That is, the antenna holder 1160 transfers transmission of electric-wave and forms the horizontal electric field by being contacted to the bending portion 1131 of the antenna holder connection part 1130. Also, the vertical radiators 1140, 1150 and the second vertical radiators 1141, 1151 reduces polarized wave generated from edges because the vertical radiators and the second vertical radiators form a three-dimensional radiating structure generating the vertical electric field. A wave form signal transferred from the main PCB connected to the fifth port 5 of the RF switch 1010 is firstly radiated at the antenna holder 1160. An electric wave transferred from the antenna holder 1160 by the finger pattern of the first intenna 1100 is radiated by the horizontal radiator 1110 and additionally radiated in a horizontal direction by using a vertical surface of the vertical radiators 1140, 1150 and the second vertical radiators 1141 and 1151. Accordingly, the electric wave is horizontally and vertically radiated by such a three-dimensional formation of the finger pattern intenna. Therefore, the polarized waves generated from edges are reduced.

The finger pattern intenna 1100 having the three-dimensional structure dramatically increase a receiving sensibility compared to a conventional intenna when the mobile communication terminal is in a call-waiting mode. The call-waiting mode is a state of a mobile communication terminal activating only few necessary functions for waiting a call signal transmitted from other terminals or a base station. However, the sensibility may be dropped by a hand effect when a part of a user's body is contacted to the mobile communication terminal for activating target functions, for example, making a call. As described above, the hand effect is an effect degrading the receiving sensibility by a part of the user's body such as a hand. Also, a specific absorption rate (SAR) of the electric wave may increases. Accordingly, a flex pattern intenna 2100 is used when the mobile communication terminal is in a call mode according to the present embodiment for reducing the SAR of electric wave and the hand effect. The call mode is a state of the mobile communication terminal activating various functions for making a call, receiving a call, taking to an opponent or sending data.

Figure 6A:
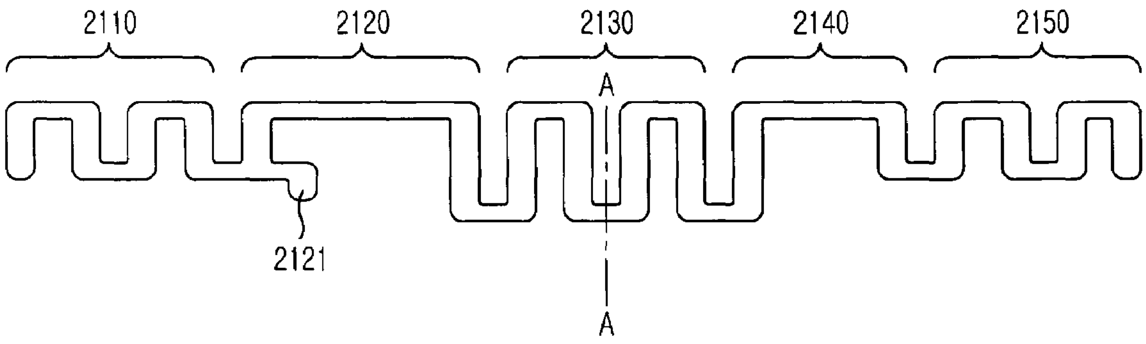
FIG. 6A is a plane view illustrating a flex pattern intenna of a mobile communication terminal having a dual intenna in accordance with a preferred embodiment of the present invention.
Figure 6B:
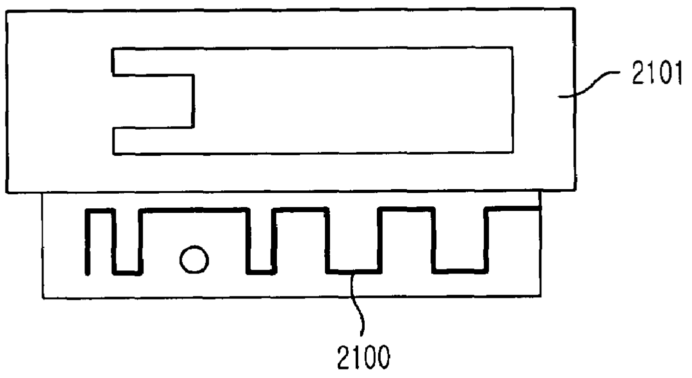
FIG. 6B is a conceptual view showing a flex pattern intenna manufactured with a ground FPCB.

FIG. 6A is a plan view illustrating a flex pattern intenna of a mobile communication terminal having a dual intenna in accordance with a preferred embodiment of the present invention and FIG. 6B is a conceptual view showing a flex pattern intenna manufactured with a ground flexible printed circuit board (FPCB).

As shown in FIGS. 6A and 6B, the flex pattern intenna 2100 must have a constant width, be extended longer than a predetermine length and include a minimum gap for preventing interference caused by a hand. Accordingly, the flex pattern intenna 2100 of the present embodiment has a curvy shape in order to extend a length of the intenna longer than a predetermined length. Corners are rounded for preventing the polarized wave to increase the receiving sensibility. As shown in FIG. 6A, the flex pattern intenna 2100 is bended several times to form a shape of several "∪"s or "∩" s. In the present embodiment, the flex pattern intenna 2100 includes a first curved portion 2110 formed at a left end of the flex pattern intenna by being bended two times as to form the shape of two "∩"s having a comparatively low height; a second curved portion 2150 formed to be symmetrical to the first curved portion 2110 at a right end of the flex pattern intenna with a comparatively low height; a third curved portion 2130 formed at a middle of the flex pattern intenna between the first curved portion 2110 and the second curved portion 2150 by being bended three times as to form a shape of three "∪"s having a height higher then the first and the second curved portion 2110 and 2150; a first connecting portion 2120 formed to have a shape of "∩" having comparatively wider width for connecting the first curved portion 2110 and the third curved portion 2130; and a second connecting portion 2140 formed to have a shape of "∩" having comparatively wider width for connecting the second curved portion 2150 and the third curved portion 2130.

In the present embodiment, a total length of the first curved portion 2110, the first connecting portion 2120, the third curved portion 2130, the second connecting portion 2140 and the second curved portion 2150 is about 39.6 mm and a width of each curved portion is about 1 mm. A width of "∩" at a left end of the first curved portion 2110 is about 1.37 mm and a width of "∩" at a right end of the second curved portion 2150 is about 0.97 mm. Also, a width of the first connecting portion 2120 is about 6.30 mm, a width of the second connecting portion 2140 is about 4 mm and a height of the third curved portion is about 6.08 mm.

Although the hand effect is reduced by lengthening the flex pattern intenna, a gain would be decreased by the lengthened flex pattern intenna. The shape and dimensions of the height, the width, and the length of the flex pattern intenna 2100 according to the present embodiment are optimized shape and dimensions by considering the above described relation between the hand effect and the gain according to the length of the flex pattern intenna 2100. In order to compensate for the loss in gain caused by a shortened length, the flex pattern intenna 2100 according to the present embodiment may include a compensating protrusion 2121 formed at the first connecting portion 2120 or the second connecting portion 2140.

Furthermore, the flex pattern intenna 2100 is manufactured with a ground FPCB without separating them as shown in FIG. 6B. Accordingly, a manufacturing cost becomes lowered and an assembling process becomes also simplified.

Figure 7:
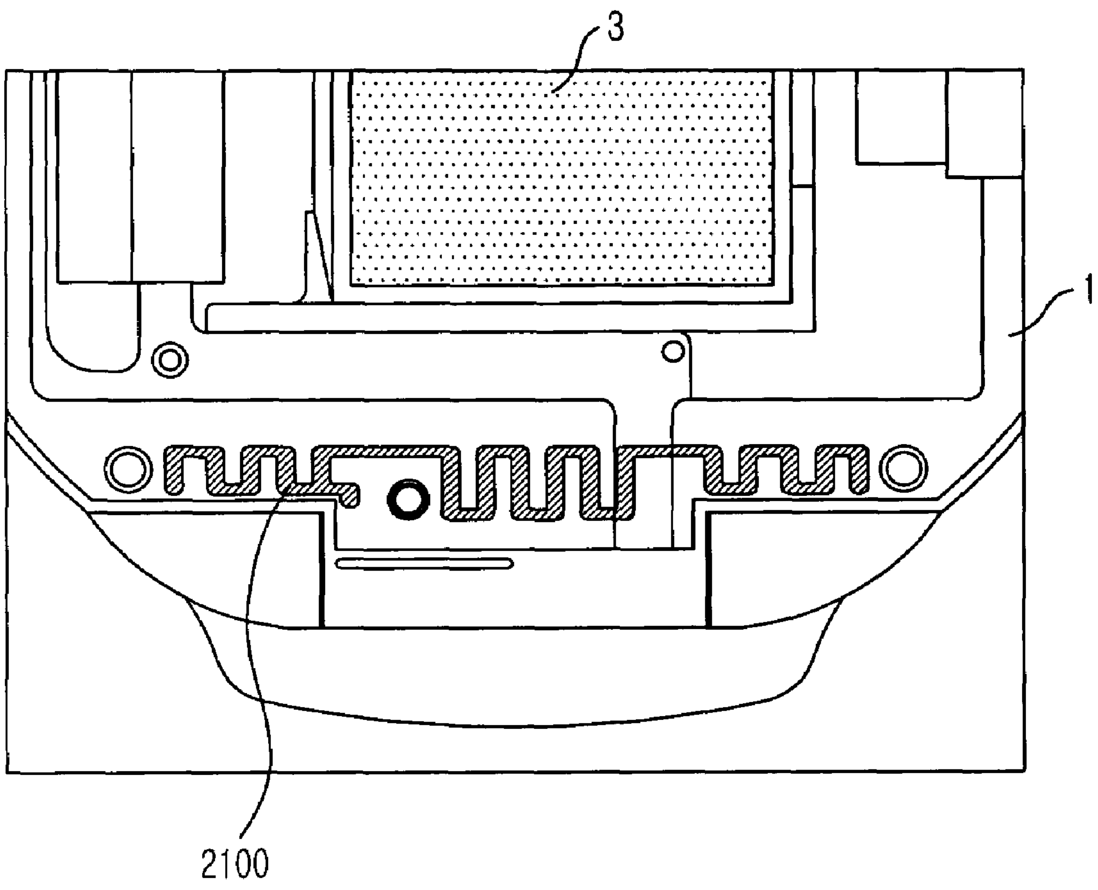
FIG. 7 is a plane view illustrating a flex pattern intenna mounted at a main body housing of a mobile communication terminal in accordance with a preferred embodiment of the present invention.

FIG. 7 is a plan view illustrating a flex pattern intenna mounted at a main body housing of a mobile communication terminal in accordance with a preferred embodiment of the present invention.

As shown in FIG. 7, it is preferable the flex pattern intenna 2100 is mounted at a housing 1 of the mobile communication terminal where a display 3 is mounted. That is, the flex pattern intenna 2100 is assembled with a ground FPCB of the display 3 as one piece and is arranged at an upper folder where the display is mounted. That is, the flex pattern intenna 2100 is mounted at a portion of the mobile communication terminal where a user's hand is less contacted in order to improve a sensibility during the call mode.

Figure 8:
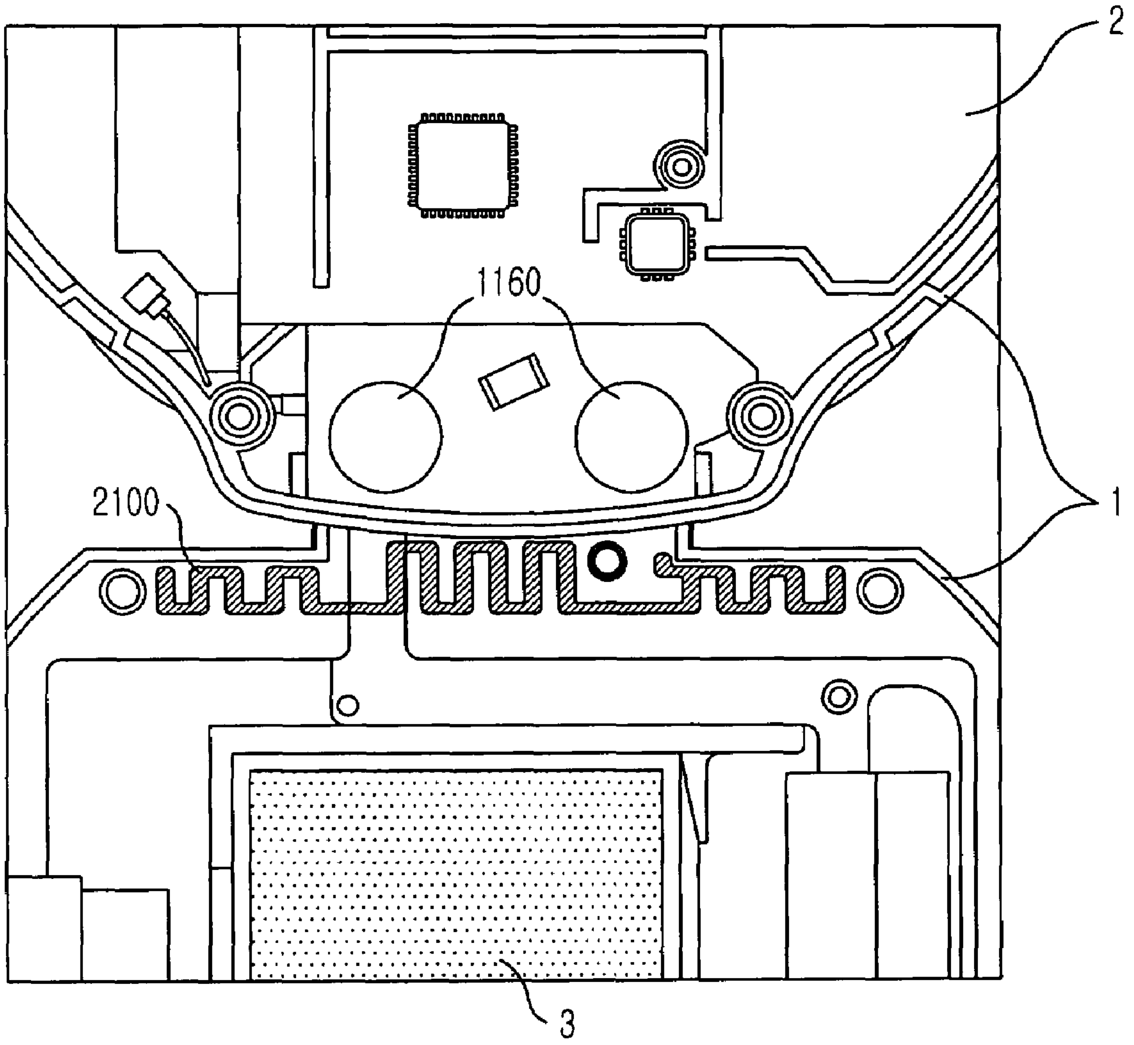
FIG. 8 is a front view showing a flex pattern intenna mounted with a finger pattern intenna inside a housing of a mobile communication terminal in accordance with a preferred embodiment of the present invention.
Figure 9:
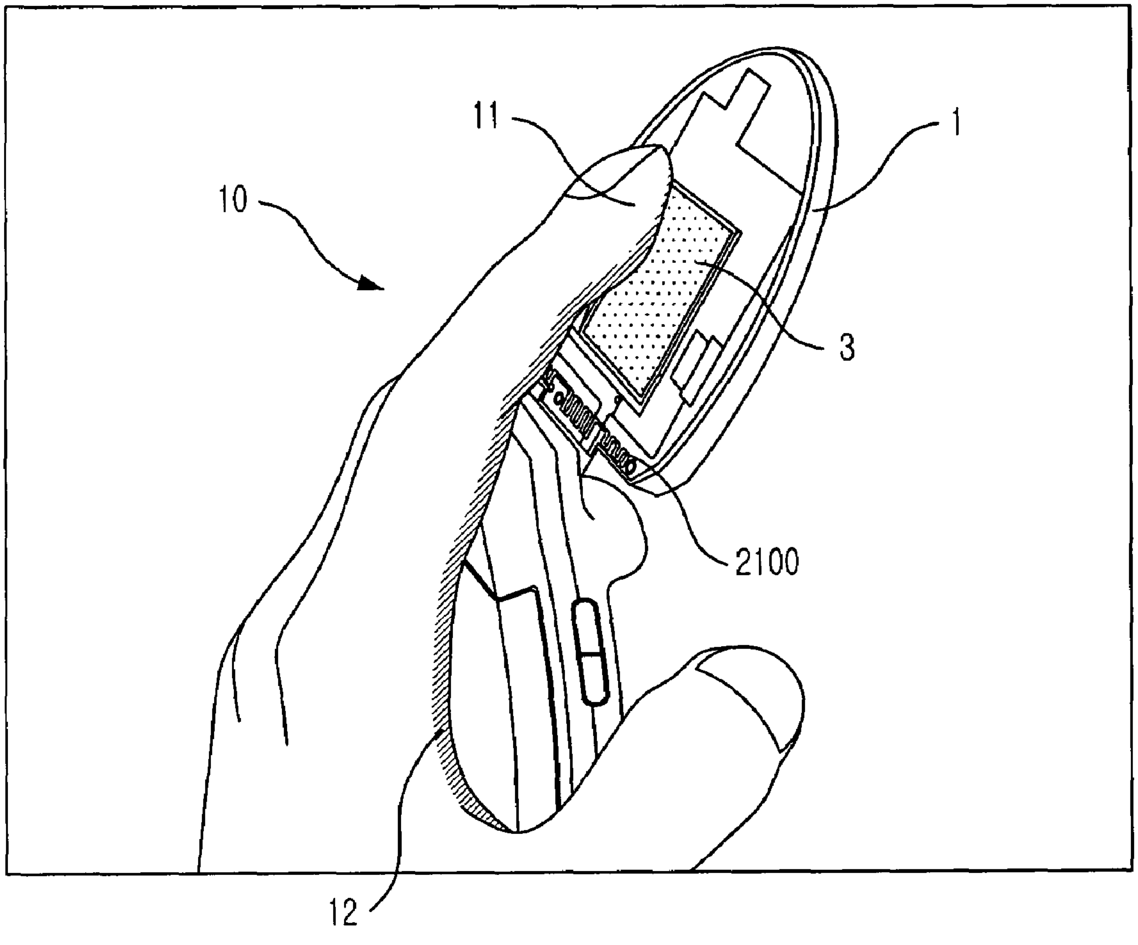
FIG. 9 is a perspective view of a mobile communication terminal having a dual antenna in accordance with a preferred embodiment of the present invention for explaining prevention of a hand effect according to a position of a flex pattern intenna and a position of a hand during communication.

FIG. 8 is a front view showing a flex pattern intenna mounted with a finger pattern intenna inside a housing of a mobile communication terminal in accordance with a preferred embodiment of the present invention and FIG. 9 is a perspective view of a mobile communication terminal having a dual antenna in accordance with a preferred embodiment of the present invention for explaining prevention of a hand effect prevention according to a position of a flex pattern intenna and a position of a hand during communication.

As shown in FIG. 7, the flex pattern intenna 2100 is mounted at an upper housing of the housing 1 where the display 3 is mounted. It is distinguishable from the conventional mobile communication terminal including the conventional intenna mounted at a bottom housing where a main printed circuit board 2 is mounted. Under the above described structure of the mobile communication terminal having the flex pattern intenna in the present embodiment, the flex pattern intenna 2100 will be located inside space of a hinge unit of the mobile communication terminal as shown in FIG. 9 when the folder unit of the mobile communication terminal is opened. Since fingers or a palm of the user's hand are seldom contacted to the hinge portion of the mobile communication terminal, the hand effect is prevented according to the present embodiment. Also, the flex pattern intenna is comparatively less influenced by interference as described above. Therefore, the flex pattern intenna is used in the call mode according to the present embodiment for reducing the hand effect caused by the user's hand.

As shown in FIG. 8, the finger pattern intenna 1100 is connected to the main printed circuit board 2 of the bottom housing by being connected to the antenna holder 1160 and the flex pattern intenna 2100 is mounted at the ground FPCB in the upper housing where the display 3 is mounted.

As described above, two distinct intennas are selectively used when the folder is closed or when the folder is opened. Generally, opening/closing the folder is sensed by using a magnetic sensor and a hold IC (not shown) mounted in a housing of a terminal, which is a well-known technology to those skilled in the art.

After determining whether the folder is opened or closed, if the folder is closed, the first port 1 and the fifth port 5 of the RF switch 1010 are connected according to the circuit shown in FIG. 3. That is, the finger pattern intenna 1100 is used when the folder is closed. The finger pattern intenna 1100 transmits/receives electric waves three-dimensionally by using the horizontal radiator and the vertical radiators as shown in FIGS. 4A to 4C. Therefore, a receiving sensitivity is improved.

If the folder is opened, the third port 3 and the fifth port 5 are connected according to the circuit shown in FIG. 3. That is, the flex pattern intenna is used when the folder is opened. Accordingly, the hand effect is lowered by the flex pattern antenna 2100 having the curvy shape by being bended several times as shown in FIG. 6A. Furthermore, the flex pattern intenna is arranged around the hinge of the upper housing of the terminal in the present embodiment. Accordingly, the flex pattern intenna is seldom contacted to fingers or palm of the user's hand. Therefore, a sensibility degradation caused by the hand effect is eliminated and the SAR of the electromagnetic wave is also reduced by the present embodiment.

Moreover, the two intennas are selectively used according to the present embodiment. Therefore, the electric power is not wasted.

As described above, the mobile communication terminal according to the present invention transmits and receives signals by using the flex pattern intenna mounted at the upper housing where the display is mounted when the folder is opened. Therefore, the hand effect and the SAR of electromagnetic wave are reduced. Furthermore, the mobile communication terminal according to the present invention receives a signal by using the finger pattern intenna having a superior receiving sensibility when the folder is closed. The finger pattern intenna is mounted around the printed circuit board in the bottom housing of the mobile communication terminal. Therefore, a receiving performance of the mobile communication terminal is improved.

The present application contains subject matter related to Korean patent application No. 2004-0049397, filed with the Korean patent office on Jun. 29, 2004, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A mobile communication terminal having a dual intenna, comprising:

a radio frequency (RF) switching unit to determine whether a folder of the mobile communication terminal is opened or closed;

a first intenna to be used if the RF switching unit determines that the folder is closed; and a second intenna to be used if the RF switching unit determines that the folder is opened, wherein the RF switching unit connects a main processing unit of a main printed circuit board of the mobile communication terminal to the first intenna if the folder is closed, and connects the main processing unit to the second intenna if the folder is opened, wherein the RF switching unit includes:

a RF switch comprising a first intenna connection port connected to the first intenna, a second intenna connection port connected to the second intenna, a main processing unit connection port connected to the main processing unit, and an intenna selection control port connecting the first intenna connection port and the main processing unit connection port in response to receiving a first electric signal, or connecting the second intenna connection port and the main processing unit connection port in response to receiving a second electric signal;

a power feeder connected to the main processing unit connection port of the RF switch to transfer an RF signal inputted through the first intenna and the second intenna to an impedance matching unit and to transfer an RF signal inputted from the impedance matching unit to the first intenna and the second intenna;

an RF switch controller to supply the first electric signal or the second electric signal to the intenna selection control port, the first electric signal to be supplied if the folder is closed, and the second electric signal to be supplied if the folder is open; and a power supplier to supply an electric power to the RF switch, and wherein the RF switch controller includes:

a voltage supplier connected to the intenna selection control port of the RF switch to supply the first electric signal to the intenna selection control port;

a transistor having one end connected to the voltage supplier and the intenna selection control port in parallel and another end connected to a ground, the ground to supply the second electric signal; and an open/close state sensor to transmit a low electric signal or a high electric signal to the transistor according to if the folder is opened or if the folder is closed in order to turn on or off the transistor.

2. The mobile communication terminal having a dual intenna as recited in claim 1, wherein the open/close state sensor comprises magnetic sensors arranged at both side of the folder of the mobile communication terminal.

3. The mobile communication terminal having a dual intenna as recited in claim 1, wherein the open/close state sensor transmits the low electric signal to the transistor if the folder is closed and transmits the high electric signal to the transistor if the folder is opened;

the transistor is turned off by receiving the low electric signal from the open/close state sensor and is turned on by receiving the high electric signal from the open/close state sensor; and the RF switch connects the main processing unit connection port and the first intenna connection port in response to receiving the first electric signal having a high level and connects the main processing unit connection port and the second intenna connection port in response to receiving the second electric signal having a low level.

4. The mobile communication terminal having a dual intenna as recited in claim 3, wherein if the folder of the mobile communication terminal is closed, the open/close state sensor transmits the low electric signal to the transistor to turn off the transistor, the first electric signal having the high level supplied from the voltage supplier is supplied to the intenna selection control port, and the main processing unit connection port and the first intenna connection port are connected in response to receiving the first electric signal such that the first intenna is used; and if the folder is opened, the open/close state sensor transmits the high electric signal to the transistor to turn on the transistor, the turned-on transistor discharges an electric signal supplied from the voltage supplier to a ground, the second electric signal having the low level is supplied to the intenna selection control port by discharging, and the main processing unit connection port and the second intenna connection port are connected by the second electric signal such that the second intenna is used.

5. A mobile communication terminal having a dual intenna, comprising:

a radio frequency (RF) switching unit to determine whether a folder of the mobile communication terminal is opened or closed;

a first intenna to be used if the RF switching unit determines that the folder is closed; and a second intenna to be used if the RF switching unit determines that the folder is opened, wherein the first intenna includes:

a horizontal radiator comprising a flat plane radiating material and arranged in parallel to a longitudinal direction of the mobile communication terminal for forming a horizontal electric field;

a vertical radiator arranged orthogonal to the horizontal radiator for forming a vertical electric field; and a connector comprising a radiating material and connecting the vertical radiator and the horizontal radiator, wherein the first intenna is connected to a main printed circuit board through an antenna holder, and wherein the first intenna further includes an antenna holder connection part extending orthogonally to the vertical radiators from a central part of the connector and bent to the antenna holder.

6. The mobile communication terminal having a dual intenna as recited in claim 5, wherein the connector includes a bended portion to maintain a connection to the antenna holder.

7. A mobile communication terminal having a dual intenna, comprising:

a radio frequency (RF) switching unit to determine whether a folder of the mobile communication terminal is opened or closed;

a first intenna to be used if the RF switching unit determines that the folder is closed; and a second intenna to be used if the RF switching unit determines that the folder is opened, wherein the first intenna includes:

a horizontal radiator comprising a flat plane radiating material and arranged in parallel to a longitudinal direction of the mobile communication terminal for forming a horizontal electric field;

a vertical radiator arranged orthogonal to the horizontal radiator for forming a vertical electric field; and a connector comprising a radiating material and connecting the vertical radiator and the horizontal radiator, wherein the first intenna is connected to a main printed circuit board through an antenna holder, and wherein the antenna holder comprises a circular disc for forming an electric field in a horizontal direction.

8. A mobile communication terminal having a dual intenna, comprising:

a radio frequency (RF) switching unit to determine whether a folder of the mobile communication terminal is opened or closed;

a first intenna to be used if the RF switching unit determines that the folder is closed; and a second intenna to be used if the RF switching unit determines that the folder is opened, wherein the second intenna has a curvy shape with rounded corners in order to increase a length of the second intenna, and wherein the second intenna includes:

a first curved portion arranged at a left end of the second intenna by being bended two times as to form the shape of two "∩"s having a first height;

a second curved portion arranged to be symmetrical to the first curved portion at a right end of the second intenna and having the first height;

a third curved portion arranged at a middle of the second intenna between the first curved portion and the second curved portion by being bended three times as to form a shape of three "∪"s and having a second height that is greater than the first height;

a first connecting portion arranged to have a shape of "∩"having a first width for connecting the first curved portion and the third curved portion;

and a second connecting portion arranged to have a shape of "∩"having a second width that is narrower than the first width for connecting the second curved portion and the third curved portion.

9. The mobile communication terminal having a dual intenna as recited in claim 8, wherein a total length of the first curved portion, the first connecting portion, the third curved portion, the second connecting portion, and the second curved portion is about 39.6 mm;

a thickness of a copperplate forming an antenna radiating material is 1 mm and a width of each curved portion is about 1 mm;

a width of a "∩"at a left end of the first curved portion is about 1.37 mm and a width of a "∩"at a right end of the second curved portion is about 0.97 mm; and the first width of the first connecting portion is about 6.30 mm, the second width of the second connecting portion is about 4 mm, and the second height of the third curved portion is about 6.08 mm.

10. An intenna embedded in a mobile communication terminal, the intenna comprising:

a first curved portion arranged at a left end of the intenna by being bended two times as to form the shape of two "∩"s having a first height;

a second curved portion arranged to be symmetrical to the first curved portion at a right end of the intenna and having the first height;

a third curved portion arranged at a middle of the intenna between the first curved portion and the second curved portion by being bended three times as to form a shape of three "∪"s and having a second height that is greater than the first height;

a first connecting portion arranged to have a shape of "∩"having a first width for connecting the first curved portion and the third curved portion; and a second connecting portion arranged to have a shape of "∩"having a second width that is narrower than the first width for connecting the second curved portion and the third curved portion.

11. The intenna as recited in claim 10, wherein a total length of the first curved portion, the first connecting portion, the third curved portion, the second connecting portion, and the second curved portion is about 39.6 mm;

a thickness of a copperplate forming an antenna radiating material is 1 mm and a width of each curved portion is about 1 mm;

a width of a "∩"at a left end of the first curved portion is about 1.37 mm and a width of a "∩"at a right end of the second curved portion is about 0.97 mm; and the first width of the first connecting portion is about 6.30 mm, the second width of the second connecting portion is about 4 mm, and the second height of the third curved portion is about 6.08 mm.

* * * * *

UNITED STATES PATENT AND TRADEMARK OFFICE

CERTIFICATE OF CORRECTION

PATENT NO. : 7,599,725 B2
APPLICATION NO. : 11/172268
DATED : October 6, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Twenty-eighth Day of September, 2010

David J. Kappos
*Director of the United States Patent and Trademark Office*